United States Patent [19]

Bolton et al.

[11] Patent Number: 5,002,820

[45] Date of Patent: Mar. 26, 1991

[54] LAMINATED SAFETY GLASS

[75] Inventors: Nelson P. Bolton, Quakertown; Novis Smith, Philadelphia, both of Pa.

[73] Assignee: Artistic Glass Products, Trumbauersville, Pa.

[21] Appl. No.: 356,508

[22] Filed: May 25, 1989

[51] Int. Cl.⁵ .................. B32B 27/40; B32B 17/06; B32B 17/10

[52] U.S. Cl. .................. 428/215; 428/412; 428/425.6; 428/426; 428/429; 428/436; 428/441

[58] Field of Search ............ 428/426, 412, 425.6, 428/429, 436, 441, 215

[56] References Cited

U.S. PATENT DOCUMENTS

| | | | |
|---|---|---|---|
| 4,198,468 | 4/1980 | Molari | 428/412 |
| 4,364,786 | 12/1982 | Smith, Jr. | 156/99 |
| 4,799,346 | 1/1989 | Bolton et al. | 52/509 |

Primary Examiner—Ellis P. Robinson
Assistant Examiner—Amy Hulina
Attorney, Agent, or Firm—John Lezdey

[57] ABSTRACT

The invention relates to an anti-spalling laminated safety glass comprising a relatively thick front lamina, a back glass lamina having a thickness of 0.3 to 1.8 mm, and an intermediate resinous bonding layer, and glazing units formed therewith.

17 Claims, 1 Drawing Sheet

LAMINATED SAFETY GLASS

FIELD OF THE INVENTION

The present invention relates to laminated safety glass structures having anti-spalling characteristics. More particularly, the invention relates to laminated safety glass structures including aircraft and automobile windshields which are subjected to high impact forces caused, for example, by accidental contact with objects. The safety glass structures may be used for aircraft, land vehicles, as armor structures for security installations, and the like.

BACKGROUND OF THE INVENTION

Energy-absorbing laminates for use as safety glass is well known. Customarily, these products are formed from transparent materials of different compositions and are composed of an outer layer of one or more plies and an inner layer which is bonded together with the outer layer by a resinous interlayer. Usually, a relatively thick outer layer is combined with at least one relatively thin inner layer.

For bulletproof laminated safety glass and for windshields, it is generally believed that the inner layer should be a resinous material such as a polycarbonate in order to avoid spalling. Furthermore, it was believed that if the inner layer is glass, an antispall covering of a resinous material is necessary to reduce the risk of flying glass splinters upon impact.

The use of so-called safety glazing or penetration resistant glazing for windows, windshields, and the like using multiple layers of polycarbonate, glass and other resinous materials is well known. For example, glass-polycarbonate resin laminates are described in U.S. Pat. Nos. 4,663,228 and 3,666,614.

In U.S. Pat. No. 3,520,768 there are described laminates of relatively thick glass having a comparatively thin polycarbonate foil as the cohering layer. While generally useful, these laminates suffer from an inability to withstand multiple shots, especially when struck by high velocity bullets such as those fired from rifles. Thus, for example, in prior art laminates utilizing thick forward-facing (impact receiving) glass plies, multiple shots at the thick glass front ply cause much glass cracking and removal of the glass from the laminated structure, making it vulnerable to repeat hits. In order to withstand the repeated hits, the laminates had to be extremely thick and heavy. Even these thick and heavy laminates were not entirely successful, since spalling on the back side or downstream face of said laminates occurred with the resultant danger of injury due to this spalling to persons behind these laminates.

Thus, there is a need for laminates which are capable of withstanding repeated high velocity strikes without penetration and/or spalling of the back or downstream layer.

U.S. Pat. No. 4,125,669 to Triebel et al discloses a laminated safety glass which utilizes a thick outside layer of silicate glass which is bonded to a polycarbonate pane of at least 1.5 mm thick.

U.S. Pat. No. 4,312,903 to Molari discloses impact resistant, double glazed structures comprising a plurality of laminae selected from polycarbonate, glass and solid resinous materials. The glass laminae faces the direction of impact and has a thickness from about 30 to 220 mils. The structure utilizes relatively thick outward layers and relatively thin inward layers.

U.S. Pat. Nos. 4,663,228 and 4,799,346 to Bolton et al, which are herein incorporated by reference, disclose laminated safety glass structures which are preferable for use in the present invention. However, the inward layers disclosed in this patent have a thickness which would not provide the anti-spalling characteristics of the invention.

SUMMARY OF THE INVENTION

According to the present invention there is provided a laminated safety glass having anti-spalling characteristics. More particularly, there is provided a laminated safety glass comprising a front lamina facing and nearest to the direction of impact having a thickness of at least 1 mm, preferably at least 20 mm for armor glass, a back glass lamina essentially having a thickness of about 0.3 mm to not greater than 1.8 mm and an intermediate bonding layer, the intermediate bonding layer having a thickness of at least about 1 mm, preferably 20 to 220 mm for armor glass.

It is critical in the present invention that the back glass lamina does not exceed 1.5 mm for ordinary window glass or armor glass since there is a rapid disintegration of beneficial effects if the glass lamina exceeds such thickness. However, the back laminate may be coated with a hard abrasion resistant coating, for example, a silane or siloxane without loss of the anti-spalling characteristics. A thickness of the back glass lamina of about 1 mm has been found to be suitable for most glazing units.

The front lamina may comprise one or more plies of conventional sheet material which is utilized in preparing transparent laminated glazing units.

The laminated structure may be utilized together with a suitable peripheral structure to be used in a supporting structure.

To the accomplishment of the foregoing and related ends, the invention, then, comprises the features hereinafter fully described and particularly pointed out in the claims, the following description and annexed drawings setting forth in detail certain illustrative embodiments of the invention, these being indicative, however, of but several of the various ways in which the principles of the invention may be employed.

DETAILED DESCRIPTION

Figure 1:
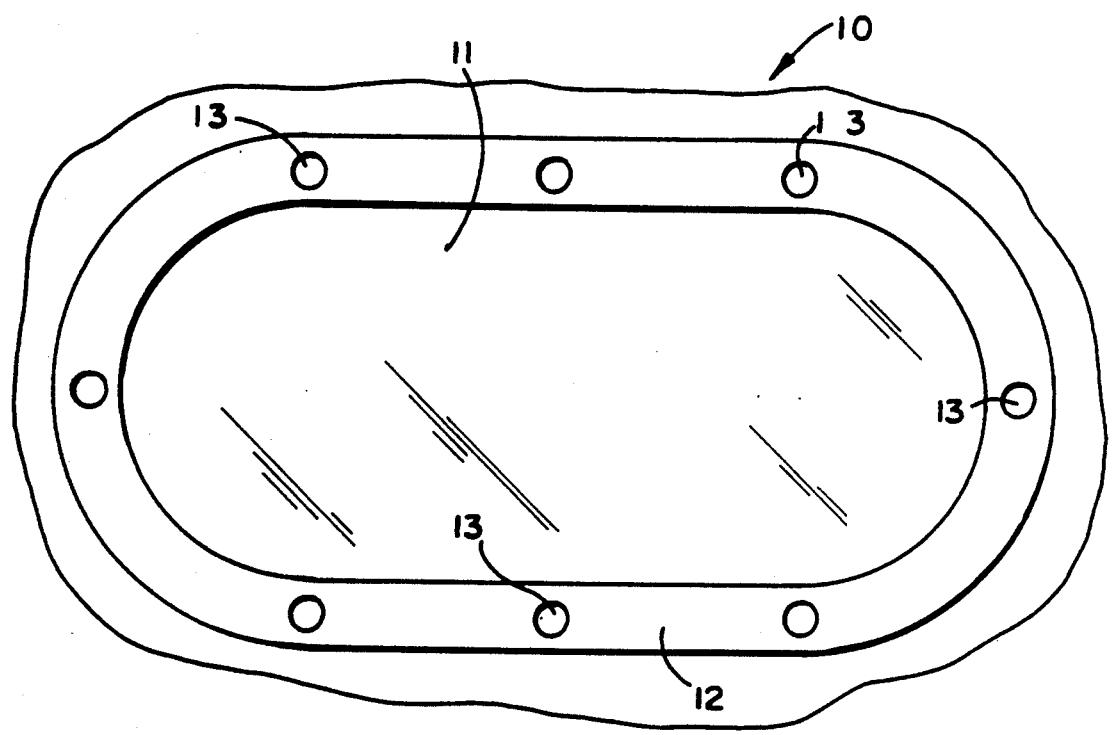
FIG. 1 is a schematic view in plan of a windshield embodying the invention.
Figure 2:
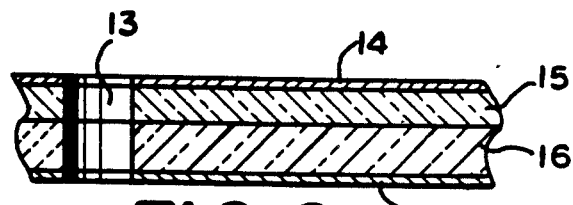
FIG. 2 is a sectional view taken along the plane of line 2—2 of FIG. 1 showing the construction of the panel with parts being broken away; and, FIG. 3 is a sectional view showing a modification of the invention.

Referring to FIGS. 1 and 2, a laminated windshield 10 is shown having a center portion 11 which is transparent and an edge portion 12 for fastening to a suitable supporting structure such as a frame or other fuselage members of an aircraft, not shown. Bolt holes 13 may be provided at spaced-apart positions around the edge portion 12 through which bolts (not shown) may be disposed for fastening the edge portion of the windshield 10 to the aircraft fuselage. A bushing (not shown) may be installed in each aperture. Each bushing serves primarily to transmit the mounting load of the edge portion 12 to the suitable supporting structure through the thickness of the edge portion and not for transmitting a load parallel to the major surfaces of the window. Suitable bushings are composed of a lightweight material that is chemically inert at normal operating temperatures, such as aluminum and fiberglass, for example.

An outer protective coating 14 is provided at the outer surface of the windshield 10 and is preferably of an abrasion, chemical and thermal resistant material.

The outer protective coating is bonded to an outer layer 15. The outer layer 15 has a thickness of about 30 mm and is bonded to an interlayer 16 of elastomeric resin, preferably polyurethane or ionomer having a thickness greater than 20 mm and in this embodiment has a thickness of 150 mm.

The inter layer 16 is bonded to the anti-spalling prevention layer 17 which is a suitable glass.

Figure 3:
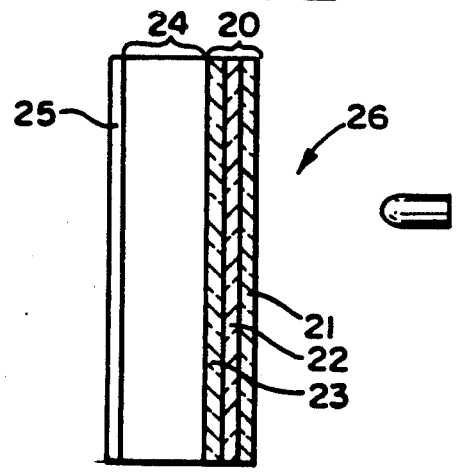

FIG. 3 illustrates a laminate 26 having an outer layer 20 comprising a plurality of sheets 21, 22 and 23 which are adhesively bonded together. The outer layer 20 is bonded to an interlayer 24 which is bonded to the glass anti-spalling layer 25.

Any of the usual polycarbonate resins can be used as outer laminae for the present invention including but not limited to those described in U.S. Pat. Nos. 3,161,615; 3,220,973; 3,312,659; 3,312,660; 3,313,777; 3,666,614, among others, all of which are included herein by reference. Preferably, of the polycarbonate resins commercially available are under the trademarks of "LEXAN" or "MERLON" from General Electric Co. and Mobay Chemical Co., respectively.

Any of the usual types of glass used in so-called safety applications can be used in conjunction with the present invention including chemically and thermally strengthened or tempered glass as well as common untempered glass where indicated. Amongst the glasses which may be used are silicate glass, E-glass, Toroglass, etc. The type used depends upon the intended use of the laminate. The nature and composition of some of the various glasses is known in the art and described, for example, in the "Encyclopedia of Chemical Technology" by Kirk-Othmer, published by Interscience Encyclopedia Inc., New York, N.Y., Vol. 7, pages 181-189, et seq., which is herewith incorporated by reference.

Where desirable, adhesion promoting primers can be used to promote adhesion, such material being well known and including, among others, vinyl alkoxy silanes, amino-alkylalkoxy silanes, alkoxy silanes, silyl peroxides and amino-alkoxy silanes, such materials being described in the above U.S. Pat. No. 3,666,614 and elsewhere. A particular advantage of the present invention is that primers or protective layers are not necessary in connection with any polycarbonate or resin used.

The solid resinous materials which may be used include ABS plastics based on combining acrylonitrile, butadiene and styrene; acetal homopolymers; acetal copolymers produced by polymerization of trioxane and ethylene oxide; acrylics; epoxy resins; nylons, those prepared from a diamine and a diacid and those prepared from an amino acid or amino acid derivative; phenolics; polycarbonates; phenylene oxide based resins such as polyphenylene oxide and blends of polyphenylene oxide and styrene resins; polyaryl ethers; polyesters; polyethylenes; polyphenylene sulfides; polypropylene; polysulfones; polyurethanes; silicones; ethylene polymers such as ethyl vinyl acetates; conductive plastics; ionomers; and ordered aromatic copolymers, etc. These solid resinous materials can be formed into sheets. Other materials which may be included within the scope of this invention are described in U.S. Pat. No. 3,662,440, which is incorporated herein by reference.

Preferable of the bonding materials which may be used in the present invention are the crosslinked ionomers such as disclosed in U.S. Pat. Nos. 4,663,228 and 4,799,346 to Bolton et al, which are herein incorporated by reference.

Laminates constructed using the present block copolymers also find particular application in locomotive windshields and glazing as well as transportation glazing in general where resistance to rocks and other missiles or flying objects is desirable. At the same time, resistance to spalling on the inboard side and protection of the occupants from flying chards or splinters of glass is desirable. The assembled layers are heated in a vacuum bag to 250° F. and pressurized to 250 psi for 45 minutes at temperature. The laminates are then cooled slowly under pressure to 120° F. and removed. A particular locomotive windshield or windscreen consists of an outboard layer of 250 mm of primed strengthened glass, an interlayer of 60 mm of a crosslinked ionomer, and an inboard layer of 1.5 mm of chemically tempered glass as disclosed in U.S. Pat. No. 3,395,998 and commercially available from PPG Glass Company of Pittsburg, Pa. and Corning Glass Works of Elmira, N.Y. with an outboard abrasion-resistant coating. Such a windshield defeats penetration by heavy objects and at the same time precludes flying glass in the cab interior.

It is also understood that while the present invention illustrates an interlayer of extruded transparent plastic material, the term "interlayer" as it is contemplated for use of the present invention may comprise one or more layers of extruded transparent plastic material bonded to one another or made integral to one another with intermediate layers of transparent material of either rigid or flexible nature therebetween. The term "interlayer" as herein contemplated also includes structures comprising rigid plies of coated or uncoated glass or polycarbonate or acrylic or polyester and/or flexible plies of polyurethane, and other esters commonly used as interlayer materials or combinations of rigid and flexible materials within outer plies of extruded transparent plastic material so that the "interlayer" has outer surfaces of extruded transparent plastic material facing a glass surface or a coated glass surface.

The transparent plastic material of the interlayer of the laminated unit may be the conventional type commonly used as the interlayer of laminated glass windshields which may or may not require the use of adhesive interlayers.

The interlayer may comprise one or more layers of polyurethane, polyvinyl butyral resin, polyethylene terephthalate, commercially available as Du Pont's "MYLAR", polyesters, ionically cross-linked ethylene-methacrylic acid copolymer or ethylene-acrylic acid copolymer which may be neutralized with a polyamine, and the like.

The polyurethanes preferably used according to the principles of the present invention can broadly be described as the reaction product of a polyisocyanate and polyol which upon lamination forms a transparent layer. The polyurethanes may have thermosetting or thermoplastic properties, but preferably exhibit thermoplastic properties. Thus, for example, an organic diisocyanate is reacted with a relatively long chain diol and a curing agent which is usually a monomeric compound having at least two active hydrogens per molecule, as determined by the Zerewitinoff test described in Kohler, J. Am. Chem. Soc., 49,3181 (1927). Suitable polyisocyanates are organic diisocyanates which include aromatic, aliphatic, cycloaliphatic and heterocylic diisocyanates. Examples are 2,4- and 2,6-toluene diisocyanate, 1,4-butane diisocyanate, 1,2-isocyanato-methyl cyclobutane, 4,4-methylene-bis (cyclohexyl isocyanate), 1,10-decane diisocyanate, and furfurylidene diisocyanate.

Suitable long chain diols include polyester diols. The polyester diols can be prepared by the polyesterification reaction of an aliphatic dibasic acid or an anhydride thereof with a diol, preferably an aliphatic diol. Suitable aliphatic dicarboxylic acids can be represented by the formula HOOC-R-COOH wherein R is an alkylene radical containing from 2 to 12, and preferably 4 to 8, carbon atoms inclusive, examples of which are adipic, succinic, palmite, suberic, azelaic and sebacic moieties. Suitable aliphatic diols contain from 2 to 15 carbon atoms, exemplary of which are ethylene glycol, 1,3-propanediol, 1,4-butanediol and 1,6-hexanediol. The average molecular weight of the polyester diol should be between 750 and 5000, preferably between 1000 and 3300. The preferred polyester diol is poly 1,4-butylene) adipate having a molecular weight of about 1800 to 2200.

The ionomer resin which can be used in the invention is obtained as described in U.S. Pat. No. 4,799,346 by combining a copolymer of ethylene-methacrylic acid or ethylene-acrylic acid and a polyamine which contains at least one R—$CH_2$—$NH_2$ group, and the R may contain: (—$CH_2NH_2$)x; or, (R'R"NH)y, where x=1 or more, and y=0 or more. R' and R" may be any organic groups. The preferable structure of the diamine is:

$NH_2CH_2$—(R)—$CH_2NH_2$ where R contains from one to twenty-five carbon atoms; R may be aliphatic, alicylic or aromatic.

In addition, the copolymer may already be partially neutralized with up to 90% of a metal cation such as sodium or other alkali metal, ammonium salt, zinc or an aluminum salt. A particular example of such a copolymer is "SURLYN" 1601, manufactured by the Polymer Products Department of the DuPont Company.

The outer sheets and/or inner sheets which may be used in the invention may be any well known commercial plate, float or sheet glass composition, polycarbonate resin, fused acrylic/polycarbonate resins, acrylic resins, polyurethanes, ionomer resins, allyl diglycol carbonate resins and the like. The sheets may be coated with an abrasion resistant coating.

Preparation of Laminate

A cross-linked partially neutralized ethylene-acrylic acid ionmer resin was added to the resin port of a small extruder having an extruding barrel temperature which was maintained at 325 degrees–400 degrees Fahrenheit. A film about 1.5 millimeters (50–60 mils) was extruded and cut into twelve inch squares, stacked to about 12 millimeter thickness between a 1.1 millimeters sheet and a 1 millimeter of strengthened glass plates. The assembly was placed in a so-called "polymer" bag of the type disclosed in U.S. Pat. No. 3,311,517 to Keslar et al. The bag comprises an outer ply of polyethylene terephthalate and an inner ply of polyethylene bonded thereto. The bag was inserted into a second bag of the same material, evacuated and sealed. The sealed unit was placed in an anotclave at 255 degrees Fahrenheit for three minutes under 150–200 psi pressure in a vacuum. The unit was then cooled to room temperature and the pressure reduced. The assembly was removed from the autoclave and the bags and plastic wrapping were removed from the assembly.

The resulting windshield is then ready to insert into a suitable support or frame and secured therein.

For automotive and aircraft windows the resinous inner layer will usually vary between 15 and 60 mils. (0.38 and 1.52 mm). Greater thickness can be utilized for armor vehicles.

In order to more fully and clearly illustrate the present invention, the following specific examples are presented. It is intended that the examples be considered as illustrative rather than limiting the invention disclosed and claimed herein. In the examples all parts and percentages are on a weight basis unless otherwise specified.

EXAMPLES

A series of laminated glass samples were prepared. The overall dimensions were 500 mm×500 mm. The laminates were subjected to a modified automobile test no. 297. This test consists of a hundred pound lead shot bag being suspended as a pendulum. The laminates are mounted in a vertical position and the shot bag is pulled back thirty-six inches from the object and permitted to fall and hit the laminate, the attack being the hitting of the laminate. In all cases the samples shattered on impact. The particles were collected that came off the inboard side of the laminate and weighed. The inside surface was also observed for any sharp or pointed pieces projecting from the surface. The box behind the sample measured 500×500×150 mm deep.

Deformation was measured after attack from flat to broken surface in static condition.

The outboard ply and the inboard ply were thermally tempered glass.

| Sample | Outboard Ply | Interlayer | Inboard Ply | Avg. Wt. of Spall | Deformation |
| --- | --- | --- | --- | --- | --- |
| 1 | 4 mm | monolithic tempered glass | | 1183 | 0 |
| 2 | 1 mm | 1 mm ionomer | 0.8 mm | none | 10 mm |
| 3 | 1 mm | 1 mm ionomer | 1 mm | none | 10 mm |
| 4 | 1 mm | 1 mm ionomer | 1.5 mm | none | 9 mm |
| 5 | 1 mm | 1 mm ionomer | 2 mm | 0.47 g | 8.3 mm |
| 6 | 1 mm | 1 mm ionomer | 2.5 mm | 1.67 g | 6.3 mm |
| 7 | 2.7 mm | 0.75 mm PVB | 2.7 mm | 13.5 g | 31 mm |
| 8 | 1 mm | 1.5 mm urethane | 1 mm | none | — |

-continued

| Sample | Outboard Ply | Interlayer | Inboard Ply | Avg. Wt. of Spall | Deformation |
|---|---|---|---|---|---|
| 9 | 1 mm | 0.076 PVB | 1.8 mm | none | — |

Sample 1 completely disintegrated.

What is claimed is:

1. An anti-spalling laminated safety glass comprising:
   a front lamina facing and nearest to the direction of impact having a thickness of at least 1 millimeter;
   an anti-spall lamina on the side farthest to the direction of impact consisting of a glass having a thickness of about 0.3 to not greater than 1.8 millimeters; and
   an intermediate resinous bonding layer having a thickness of at least 1 millimeter.

2. The safety glass laminate of claim 1 wherein said front lamina comprises a plurality of plies of sheet material.

3. The safety glass laminate of claim 1 wherein said front lamina comprises polycarbonate.

4. The safety glass laminate of claim 1 wherein said front lamina comprises glass.

5. The safety anti-spall laminate of claim 1 wherein said back glass laminate has a thickness of about 1 millimeter.

6. The safety anti-spall laminate of claim 1 wherein said back glass laminate is a silicate glass.

7. The safety anti-spall laminate of claim 1 wherein said back glass laminate is chemically strengthened glass.

8. The safety glass laminate of claim 1 wherein said intermediate layer is an ionomer.

9. The safety glass laminate of claim 8 wherein said ionomer is crosslinked.

10. The safety glass laminate of claim 8 wherein said ionomer is neutralized by an organic polyamine.

11. The safety glass laminate of claim 1 wherein said intermediate layer comprises a polyurethane.

12. The safety glass laminate of claim 1 wherein at least one of exposed surface is coated with an abrasion resistant coating.

13. The safety glass laminate of claim 12 wherein said abrasion resistant coating comprises a siloxane.

14. A transparent laminated window having anti-spalling characteristics adapted for mounting on a support structure comprising the safety glass laminate of claim 1 and an attachment member.

15. The window of claim 14 wherein said front lamina is glass.

16. The window of claim 14 wherein said front lamina is polycarbonate.

17. The window of claim 14 wherein said front lamina has a thickness of at least 20 millimeters.

* * * * *